United States Patent
Phillips

(10) Patent No.: US 11,672,211 B1
(45) Date of Patent: Jun. 13, 2023

(54) THINNING OR CLEARCUT HEAD

(71) Applicant: Gary Phillips, Northport, AL (US)

(72) Inventor: Gary Phillips, Northport, AL (US)

( * ) Notice: Subject to any disclaimer, the term of this patent is extended or adjusted under 35 U.S.C. 154(b) by 0 days.

(21) Appl. No.: 17/469,982

(22) Filed: Sep. 9, 2021

Related U.S. Application Data

(63) Continuation-in-part of application No. 16/404,817, filed on May 7, 2019, now abandoned.

(51) Int. Cl.
*A01G 23/083* (2006.01)

(52) U.S. Cl.
CPC .................................. *A01G 23/083* (2013.01)

(58) Field of Classification Search
CPC .... A01G 23/08; A01G 23/081; A01G 23/083; A01G 23/091; A01G 23/093; A01G 23/095
See application file for complete search history.

(56) References Cited

U.S. PATENT DOCUMENTS

| | | | |
|---|---|---|---|
| 3,554,245 A | 1/1971 | Eynon | |
| 3,658,104 A | 4/1972 | Hamilton | |
| 4,815,506 A | 3/1989 | Kainz | |
| 5,109,900 A | 5/1992 | Gilbert | |
| 5,553,993 A * | 9/1996 | Gilbert | A01G 23/083 144/30 |
| 5,727,610 A * | 3/1998 | Isley | A01G 23/083 144/336 |
| 5,975,166 A * | 11/1999 | MacLennan | A01G 23/091 144/335 |
| 6,123,124 A * | 9/2000 | Naud | A01G 23/081 144/335 |
| 6,691,752 B2 * | 2/2004 | DiSabatino | A01G 23/091 144/336 |
| 7,174,932 B2 | 2/2007 | Mauchien | |
| 8,141,602 B2 * | 3/2012 | Roy | A01G 23/08 144/4.1 |
| 9,603,314 B2 | 3/2017 | Voss | |

FOREIGN PATENT DOCUMENTS

CA         2466329         7/2011

OTHER PUBLICATIONS

Forestry First, 2013 John Deere 843K Fellerbuncher at Forestry First 050213, May 6, 2013, https://www.youtube.com/watch?v=VlmHxzLK9KM (Year: 2016).*

* cited by examiner

*Primary Examiner* — Matthew Katcoff
(74) *Attorney, Agent, or Firm* — Kyle A. Fletcher, Esq.

(57) ABSTRACT

The improved thinning or clearcut head is configured a tree harvesting vehicle supported by a plurality of wheels and tires. The improved thinning or clearcut head is adapted for use in cutting down a target tree. The improved thinning or clearcut head comprises a tree harvesting vehicle and a lateral pivot apparatus. The tree harvesting vehicle comprises a harvest vehicle and a cutting tool. The lateral pivot apparatus attaches the cutting tool to the harvest vehicle such that the cutting tool rotates around a lateral axis of rotation that is parallel to the center axis of the target tree. The improved thinning or clearcut head aligns the cutting tool with the target tree such that the alignment axis between the clamping arms of the cutting tool and the target tree is offset from primary sense of direction of the harvest vehicle.

19 Claims, 8 Drawing Sheets

100

103

THINNING OR CLEARCUT HEAD

CROSS REFERENCES TO RELATED APPLICATIONS

This application is a continuation-in-part of U.S. Application Ser. No. 16/404,817, filed May 7, 2019, which is incorporated by reference herein in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture, construction, and forestry, more specifically, an accessory for a feller-buncher cutting tool.

Feller-bunchers have been in use since the 1980s. Since they were first introduced, there have been no improvements to feller-bunchers. The applicant sees that there is a long felt need for an improvement to these machines, which necessitated the changes made herein. The device of this disclosure provides greater versatility over the feller-bunchers that have been in use for the last 40 years.

Tree harvesting vehicles 101 are configured for use in forestry. Specifically, the tree harvesting vehicle 101 cuts down trees. The tree harvesting vehicle 101 comprises a harvest vehicle and a traditional cutting tool. The traditional cutting tool is commonly referred to as a feller-buncher or a clearcut head. While differences exist between the feller-buncher and the clearcut head, this disclosure assumes that the feller-buncher and the clearcut head are the same.

Once aligned with a target tree 103, the traditional cutting tool: a) grasps the tree; b) cuts down the target tree 103; and, c) processes the target tree 103 by moving or further cutting the target tree 103. The traditional cutting tool further comprises a sawing base 141, a stanchion 142, and a plurality of clamping arms 143. The sawing base 141 and the plurality of clamping arms 143 attach to the stanchion 142. The stanchion 142 is an extension apparatus that separates the sawing base 141 from the plurality of clamping arms 143. The plurality of clamping arms 143 grasp the target tree 103. The sawing base cuts the target tree 103 down.

In a tree harvesting vehicle 101, the traditionally attached traditional cutting tool rigidly attaches to the bow 152 of the harvest vehicle 111. In order to use the traditional cutting tool, the center of the target tree 103 and the center of the traditional cutting tool must align along an axis that aligns with the primary sense of direction 161 of the vehicle.

The harvest vehicle 111 comprises a bow 152, a stern 153, a port 164 side, and a starboard 165 side. The tree harvesting vehicle 101 is further defined with a forward 162 direction, an aft 163 direction, a port 164 direction, a starboard 165 direction, a superior 166 direction, and an inferior 167 direction.

Tree harvesting vehicles 101 are supported using a method selected from the group consisting of a plurality of continuous tracks and a plurality of wheels and tires 151. While the plurality of wheels and tires 151 are simpler to operate and more energy efficient, the plurality of continuous tracks allows for greater precision in properly aligning the tree harvesting vehicle 101 with the target tree 103.

Clearly, a device that aligns the traditional cutting tool and the target tree 103 that simultaneously allows the primary sense of direction 161 of a wheeled tree harvesting vehicle 101 to remain at an offset alignment would be of benefit to the forestry industry.

SUMMARY OF INVENTION

The improved thinning or clearcut head is a tree harvesting vehicle. The tree harvesting vehicle is supported by a plurality of wheels and tires. The improved thinning or clearcut head is adapted for use in cutting down a target tree. The improved thinning or clearcut head comprises a tree harvesting vehicle and a lateral pivot apparatus. The tree harvesting vehicle comprises a harvest vehicle and a cutting tool. The harvest vehicle is similar in design and function to the harvest vehicle of a traditional harvesting vehicle. The cutting tool is similar in design and function to the traditional cutting tool. The cutting tool is the working element of the tree harvesting vehicle. The tree harvesting vehicle and the lateral pivot apparatus may comprise an item of forestry equipment.

The lateral pivot apparatus attaches the cutting tool to the harvest vehicle such that the cutting tool rotates around a lateral axis of rotation that rotates parallel to the center axis of the target tree. The improved thinning or clearcut head aligns the cutting tool with the target tree such that the alignment axis between the clamping arms of the cutting tool and the target tree is offset from the force of gravity. By offset is meant that the cutting tool forms a cant between the alignment of the cutting tool and the force of gravity.

Within this disclosure, the lateral axis of rotation of the cutting tool described in the prior paragraph is also referred to as the horizontal or lateral axis.

These together with additional objects, features and advantages of the improved thinning or clearcut head will be readily apparent to those of ordinary skill in the art upon reading the following detailed description of the presently preferred, but nonetheless illustrative, embodiments when taken in conjunction with the accompanying drawings.

In this respect, before explaining the current embodiments of the improved thinning or clearcut head in detail, it is to be understood that the improved thinning or clearcut head is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the improved thinning or clearcut head.

It is therefore important that the claims be regarded as including such equivalent construction insofar as they do not depart from the spirit and scope of the improved thinning or clearcut head. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention.

They are meant to be exemplary illustrations provided to enable persons skilled in the art to practice the disclosure and are not intended to limit the scope of the appended claims.

DETAILED DESCRIPTION OF THE EMBODIMENT

Figure 1:
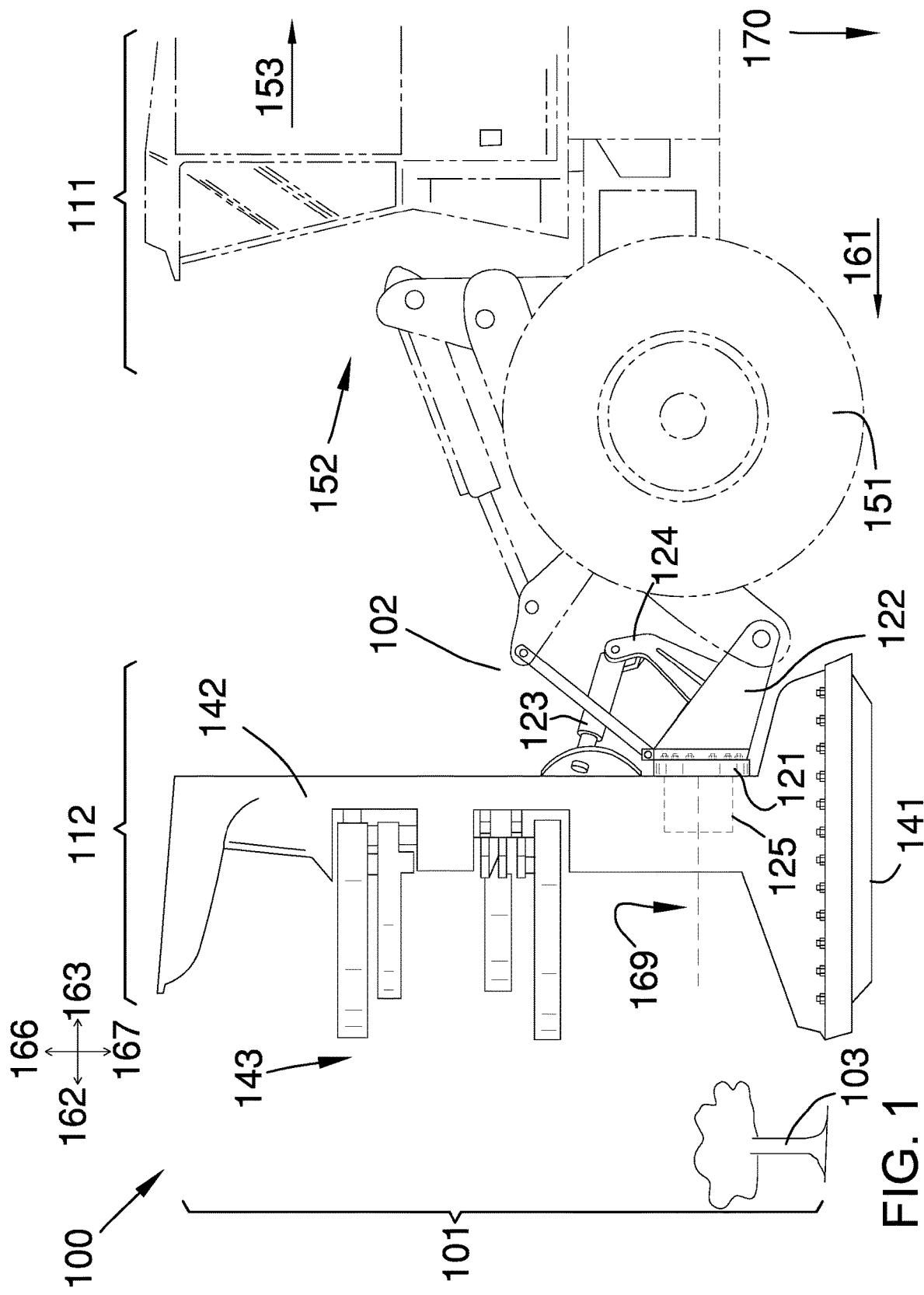
FIG. 1 is a side view of an embodiment of the disclosure.
Figure 2:
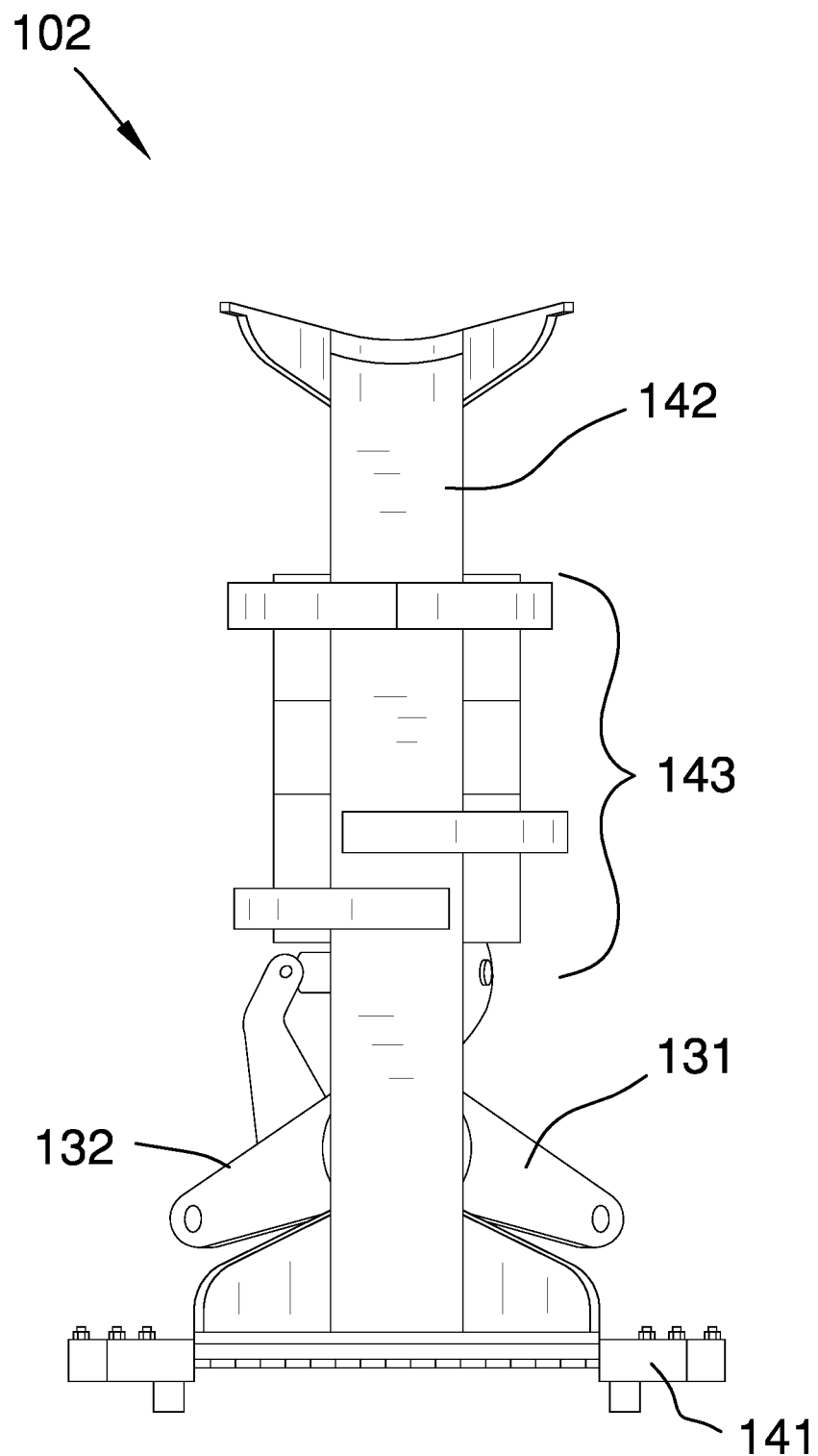
FIG. 2 is a front view of an embodiment of the disclosure.
Figure 3:
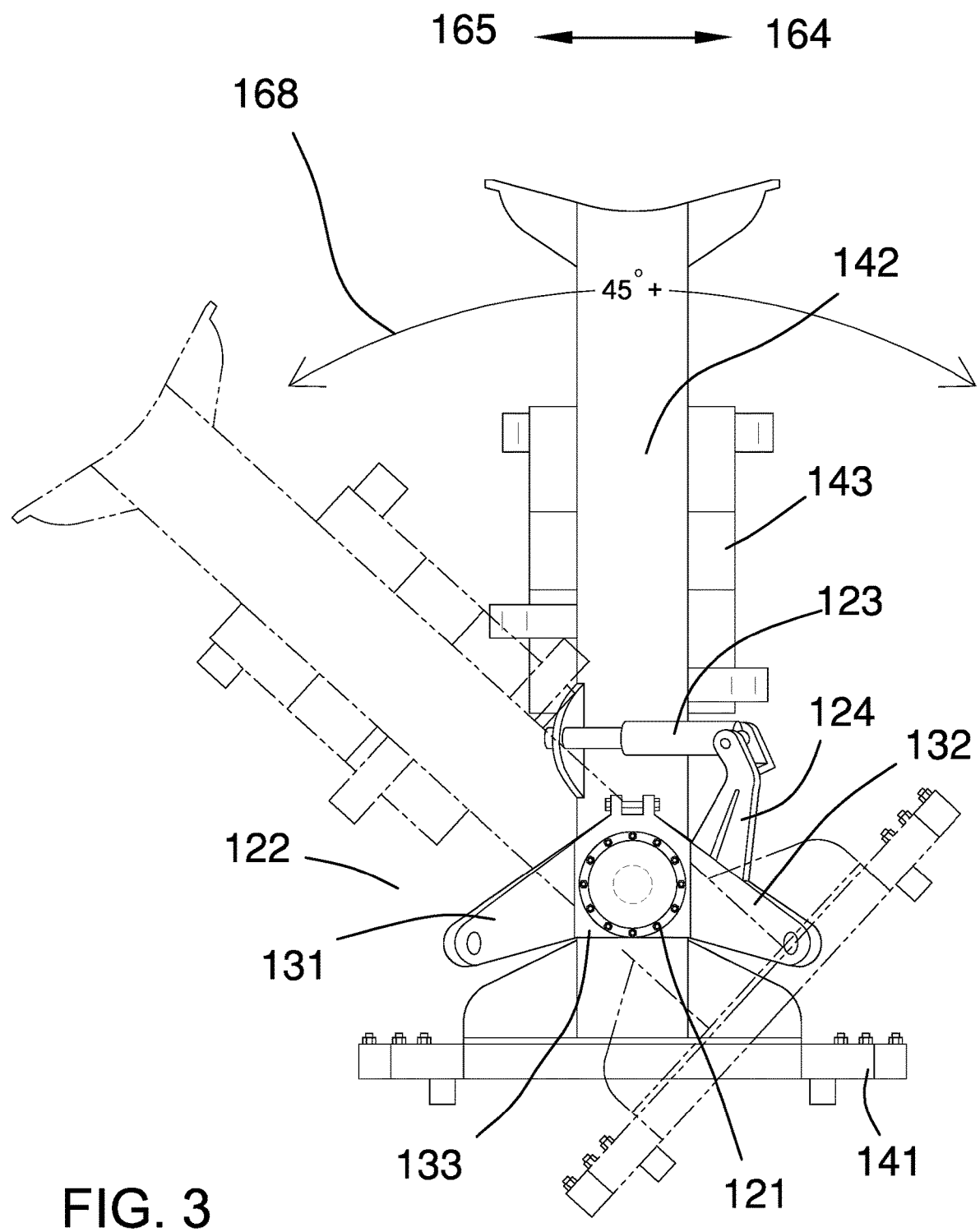
FIG. 3 is a rear in-use view of an embodiment of the disclosure.
Figure 4:
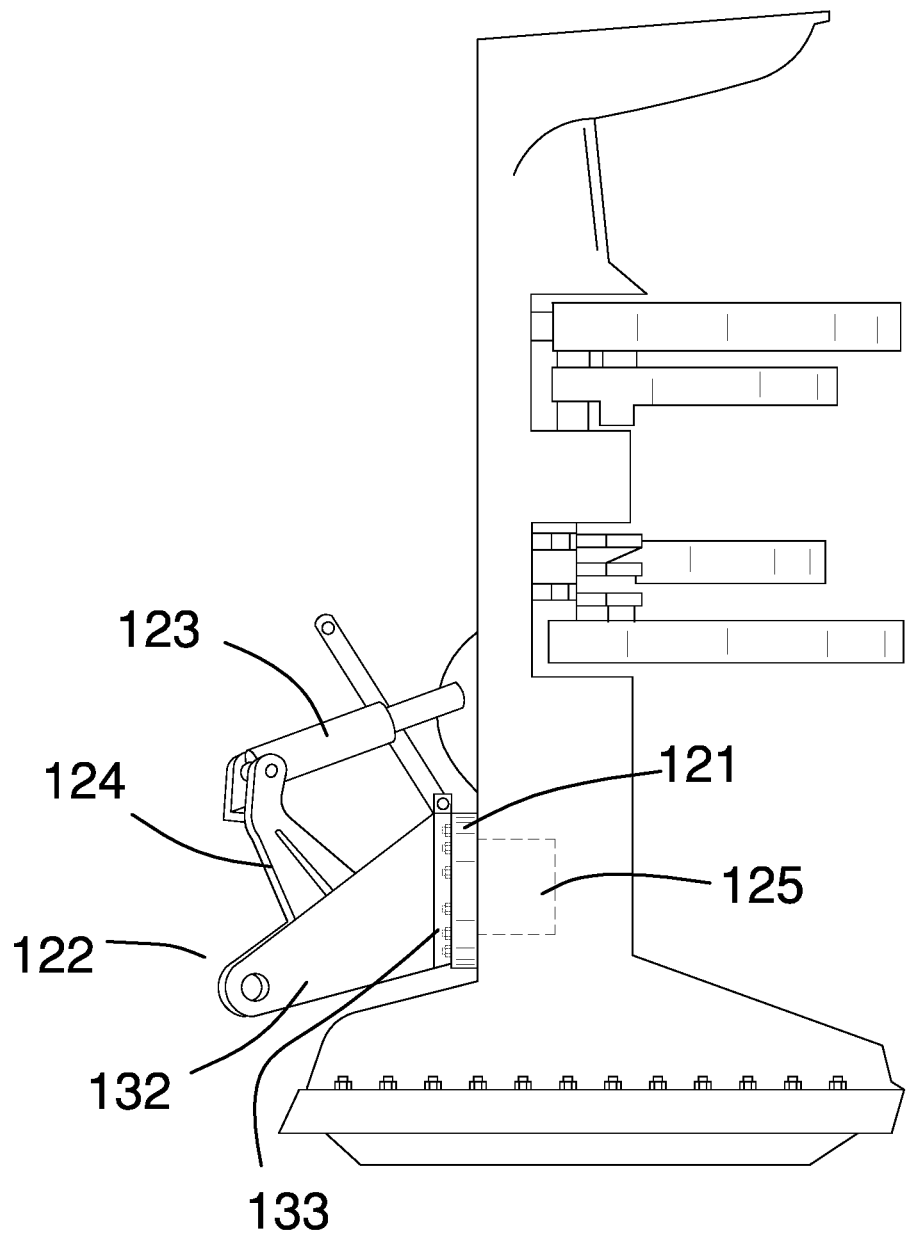
FIG. 4 is a reversed side view of an embodiment of the disclosure.
Figure 5:
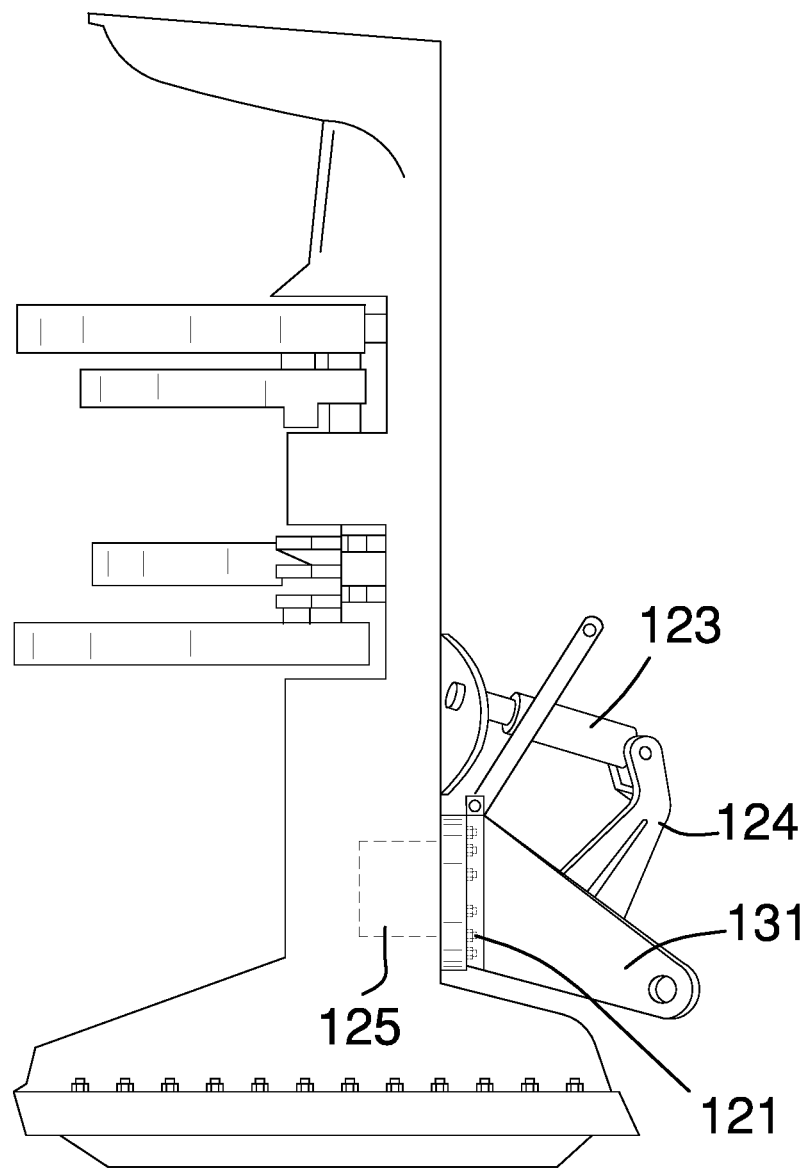
FIG. 5 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 10.

The improved thinning or clearcut head 100 (hereinafter invention) is a tree harvesting vehicle 101. The tree harvesting vehicle 101 is supported by a plurality of wheels and tires 151. The invention 100 is adapted for use in cutting down a target tree 103. The invention 100 comprises a tree harvesting vehicle 101 and a lateral pivot apparatus 102. The tree harvesting vehicle 101 comprises a harvest vehicle 111 and a cutting tool 112. The harvest vehicle 111 is similar in design and function to the harvest vehicle 111 of a traditional harvesting vehicle. The cutting tool 112 is similar in design and function to the traditional cutting tool 112. The cutting tool 112 is the working element of the tree harvesting vehicle 101.

The lateral pivot apparatus 102 attaches the cutting tool 112 to the harvest vehicle 111 such that the cutting tool 112 rotates around the lateral axis of rotation 169 that rotates parallel to the center axis of the target tree 103. The lateral pivot apparatus 102 aligns the cutting tool 112 with the target tree 103 such that the alignment axis between the clamping arms of the cutting tool 112 and the target tree 103 is offset from the force of gravity 170. By offset is meant that the cutting tool 112 forms a cant 168 between the alignment of the cutting tool 112 and the force of gravity 170.

Within this disclosure, the lateral axis of rotation 169 of the cutting tool 112 described in the prior paragraph is also referred to as the vertical axis.

The tree harvesting vehicle 101 is an agricultural vehicle. The tree harvesting vehicle 101: a) grasps a target tree 103; b) cuts down the target tree 103; and, c) processes the target tree 103. The tree harvesting vehicle 101 is supported by and moves over the ground using a plurality of wheels and tires 151. The tree harvesting vehicle 101 comprises a harvest vehicle 111 and a cutting tool 112. The harvest vehicle 111 is further defined with a primary sense of direction 161, a forward 162 direction, an aft 163 direction, a port 164 direction, a starboard 165 direction, a superior 166 direction, and an inferior 167 direction.

The primary sense of direction 161 is defined in greater detail elsewhere in this disclosure. The forward 162 direction is defined in greater detail elsewhere in this disclosure. The aft 163 direction is defined in greater detail elsewhere in this disclosure. The port 164 direction is defined in greater detail elsewhere in this disclosure. The starboard 165 direction is defined in greater detail elsewhere in this disclosure. The superior 166 direction is defined in greater detail elsewhere in this disclosure. The inferior 167 direction is defined in greater detail elsewhere in this disclosure.

The harvest vehicle 111 is a vehicle specifically intended to operate in support of an operation selected from the group consisting of a construction operation and an agricultural operation. The harvest vehicle 111 further comprises a plurality of wheels and tires 151, a bow 152, and a stern 153.

Each of the plurality of wheels and tires 151 is a rotating structure that attaches to the harvest vehicle 111 of the tree harvesting vehicle 101. Each of the plurality of wheels and tires 151 rotates to facilitate the movement of the tree harvesting vehicle 101. The use of tires and wheels is well-known and documented in the transportation arts. The wheel is defined in greater detail elsewhere in this disclosure. The tire is defined in greater detail elsewhere in this disclosure.

The bow 152 is defined in greater detail elsewhere in this disclosure. The stern 153 is defined in greater detail elsewhere in this disclosure.

The cutting tool 112 attaches to the harvest vehicle 111 such that the harvest vehicle 111 will transport the cutting tool 112 to the target tree 103. The cutting tool 112 is the working element of the tree harvesting vehicle 101. The cutting tool 112: a) grasps a target tree 103; b) cuts down the target tree 103; and, c) processes the target tree 103. The cutting tool 112 further comprises a sawing base 141, a stanchion 142, and a plurality of clamping arms 143.

The sawing base 141 is the working element of the cutting tool 112. The sawing base 141 is similar in design and function to the traditional cutting tool 112 of a traditional tree harvesting vehicle 101. The stanchion 142 is an extension structure that separates the sawing base 141 from the plurality of clamping arms 143. The stanchion 142 is similar in design and function to the traditional cutting tool 112 of a traditional tree harvesting vehicle 101. The plurality of clamping arms 143 is a mechanical structure used to grasp the target tree 103. The plurality of clamping arms 143 is similar in design and function to the traditional cutting tool 112 of a traditional tree harvesting vehicle 101.

The lateral pivot apparatus 102 is a mechanical device. The lateral pivot apparatus 102 attaches the cutting tool 112 of the tree harvesting vehicle 101 to the harvest vehicle 111 of the tree harvesting vehicle 101. The lateral pivot apparatus 102 attaches the cutting tool 112 to the harvest vehicle 111 such that the working elements of the cutting tool 112 rotate around a lateral axis of rotation 169. The lateral pivot apparatus 102 comprises a plate bearing 121, a plurality of jibs 122, a hydraulic cylinder 123, and a stanchion 142 hook 124. The lateral pivot apparatus 102 creates the cant 168 and the lateral axis of rotation 169. The cant 168 is defined in greater detail elsewhere in this disclosure. The lateral axis of rotation 169 is defined in greater detail elsewhere in this disclosure.

The plate bearing 121 is a slewing bearing structure. The plate bearing 121 attaches to the stanchion 142 of the cutting tool 112 such that plate bearing 121 forms a load path between the cutting tool 112 and the plurality of jibs 122. The plate bearing 121 attaches to the stanchion 142 of the cutting tool 112 such that the stanchion 142 rotates around a lateral axis of rotation 169. The plate bearing 121 attaches to the stanchion 142 of the cutting tool 112 such that the lateral axis of rotation 169 of the stanchion 142 aligns with the center axis of the target tree. The plate bearing 121 is a commercially available item.

The plate bearing 121 further comprises a bearing motor 125. The bearing motor 125 is a hydraulic motor that mounts within the stanchion 142 of the cutting tool 112. The bearing motor 125 provides the rotational forces required to rotate the stanchion relative to the force of gravity 170.

The plurality of jibs 122 is a mechanical structure. The plurality of jibs 122 attaches the plate bearing 121 to the bow 152 of the harvest vehicle 111. The plurality of jibs 122 forms a rigid structure that transfers the load of the cutting tool 112 and the plate bearing 121 directly to the harvest vehicle 111. The plurality of jibs 122 comprises a port 164 jib 131, a starboard 165 jib 132, and a crossbeam 133.

The port 164 jib 131 is a rigid shaft structure. The port 164 jib 131 attaches the port 164 side of the plate bearing 121 to the port 164 side of the bow 152 of the harvest vehicle 111. The starboard 165 jib 132 is a rigid shaft structure. The starboard 165 jib 132 attaches the starboard 165 side of the plate bearing 121 to the starboard 165 side of the bow 152 of the harvest vehicle 111. The crossbeam 133 is a rigid shaft structure. The crossbeam 133 attaches the port 164 jib 131 to the starboard 165 jib 132 such that the center axis of the crossbeam 133 is perpendicular to the center axes of the port 164 jib 131 and the starboard 165 jib 132. The starboard 165 jib 132 is positioned relative to the port 164 jib 131 such that the center axis of the starboard 165 jib 132 is parallel to the port 164 jib 131.

The hydraulic cylinder 123 is a telescopic structure. The hydraulic cylinder 123 rotates the stanchion 142 in the forward 162 direction and the aft 163 direction. The operation of the hydraulic cylinder 123 is driven using a pressurized fluid. The hydraulic cylinder 123 is a commercially available device. In the first potential embodiment of the disclosure, the hydraulic cylinder 123 mounts on the crossbeam 133 of the plurality of jibs 122.

The stanchion 142 hook 124 is a rigid curved structure that attaches to the lateral face of the stanchion 142. The hydraulic cylinder 123 attaches to the stanchion 142 hook 124 such that the change in length of the hydraulic cylinder 123 transfers a force to the stanchion 142 hook 124 such that the stanchion 142 rotates within the plate bearing 121.

Figure 6:
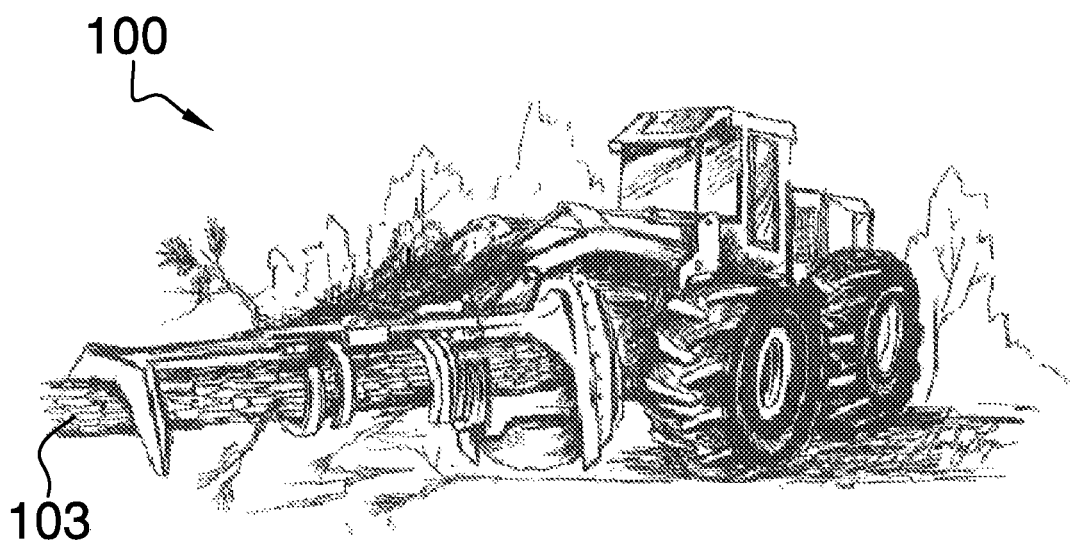
FIG. 6 is an in-use view of an embodiment of the disclosure illustrating the invention picking up a target tree from a horizontal position.
Figure 7:
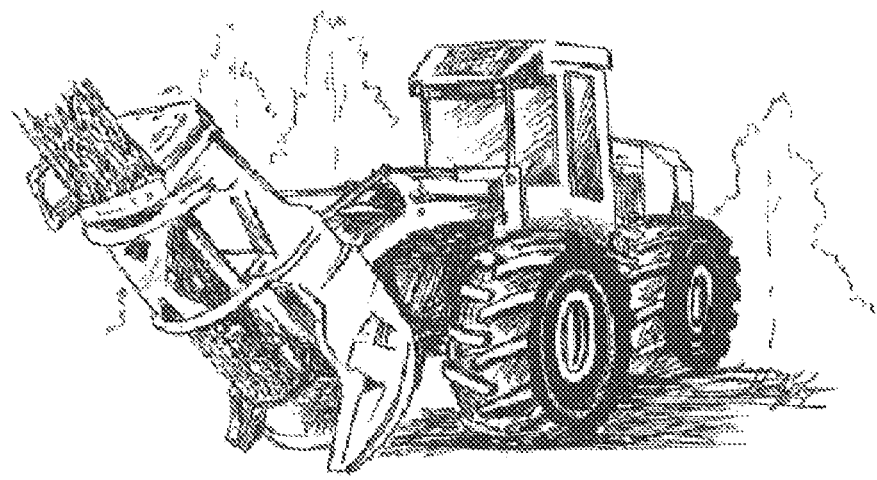
FIG. 7 is an in-use view illustrating a first deficiency of prior art apparatuses.

Turning now to FIG. 6, the figure illustrates that the item of forestry equipment may be operable to pick up a target tree from a horizontal position. In contrast, FIG. 7 illustrates a first deficiency of prior art apparatuses—specifically that the prior art equipment may be incapable of pivoting far enough to pick up a target tree from a horizontal position.

Figures 8, 9:
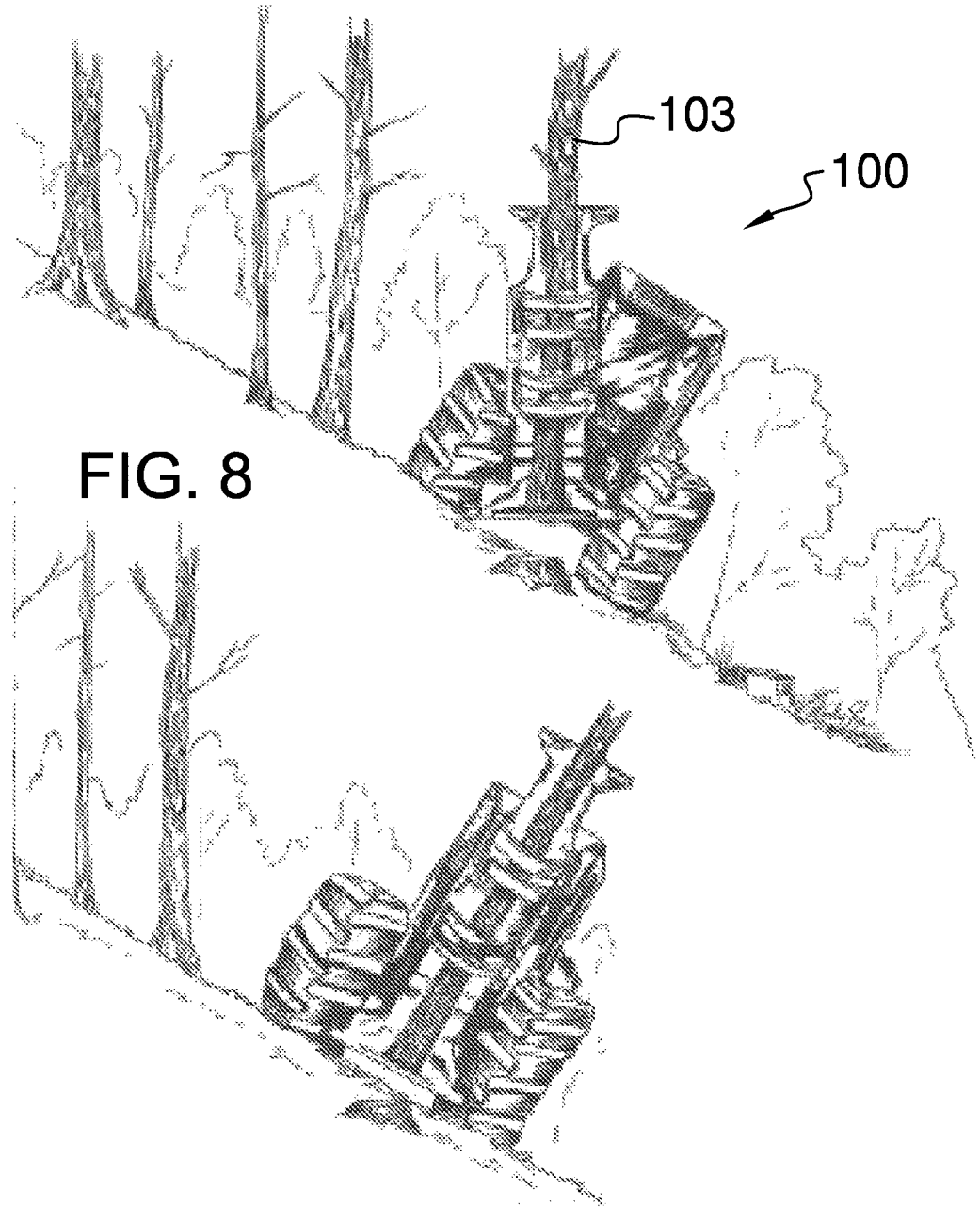
FIG. 8 is an in-use view of an embodiment of the disclosure illustrating the invention operating safely on a hillside.
FIG. 9 is an in-use view illustrating a second deficiency of prior art apparatuses.

Turning now to FIG. 8, the figure illustrates that the item of forestry equipment may be operable to operate safely on a steep hillside. The present invention may be operable to cut down the target tree while the item of forestry equipment is maneuvering on a slope of up to 45.0 degrees. This is accomplished by virtue of the fact that the lateral pivot apparatus may pivot such that the target tree may remain upright during and after the cut. In contrast, FIG. 9 illustrates a second deficiency of prior art apparatuses—specifically that the prior art equipment may be required to keep a cutting head aligned with the vehicle and may therefore necessitate that the target tree lean during and after the cut. This may create an unstable situation as the center of gravity of the combined tree and vehicle may cause the vehicle to roll.

Figure 10:
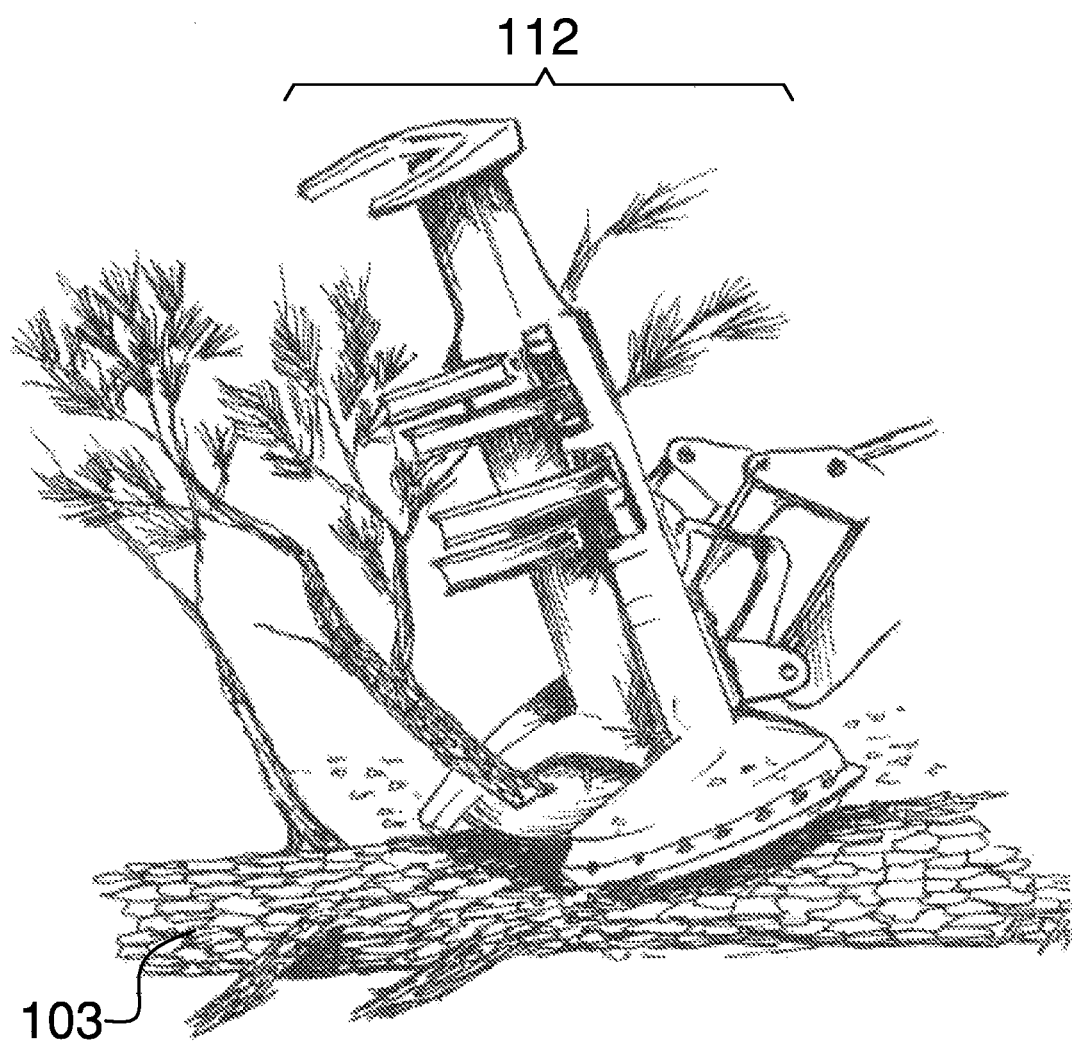
FIG. 10 is an in-use view of an embodiment of the disclosure illustrating the invention removing limbs from a target tree that is down.

Turning now to FIG. 10, the figure illustrates that the item of forestry equipment may be operable to remove limbs from a target tree that is down. The cutting tool may be adjusted to a height corresponding to the diameter of the target tree and the vehicle may pass the cutting tool over the target tree, pivoting the cutting tool from side-to-side as necessary to delimb the target tree.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Bow: As used in this disclosure, the bow refers to the anterior side of an object, vehicle, or vessel. Specifically, the bow refers to the most forward element of the object in the direction of the primary sense of direction of the object, vehicle, or vessel.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Continuous track: As used in this disclosure, the term continuous track refers to a continuous loop of treads that are used to provide traction a vehicle. The treads are attached to form the continuous loop using a pivot. The use of the pivot allows the plane formed by a first tread to rotate relative to the plane formed by an adjacent tread as the two treads are rotated around the continuous loop. The continuous track is generally wrapped around two or more wheels which are used to guide the continuous track through the continuous loop. For a motorized vehicle, the two or more wheels are mechanically rotated such that the rotation of the two or more wheels rotates the continuous track and propel the motorized vehicle. The main advantages of a continuous track relative to wheels are: 1) the continuous track will provide better traction; and, 2) the greater surface area of the continuous track relative to the wheels creates a load path the exerts less pressure on the supporting surface relative to wheels. Regularly seen vehicles that commonly use (a pair of) continuous track include, but are not limited to, military vehicles, heavy construction equipment, and mobile robotic devices. The continuous tread is commonly referred to as a tank tread.

Cut: As used in this disclosure, to cut means to use a sharpened edge to: 1) furcate an object; or, 2) to separate the surface of an object.

Hydraulic motor: In this disclosure, a hydraulic motor is a machine that converts electric energy into rotational mechanical energy. A hydraulic motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC hydraulic motor with an AC motor that has a reversible starter winding.

Force of Gravity: As used in this disclosure, the force of gravity refers to a vector that indicates the direction of the pull of gravity on an object at or near the surface of the earth.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern Furcate: As used in this disclosure, to furcate or furcation refers to the division of an object into a plurality of branches, pieces or segments.

Harvest: As used in this disclosure, harvest means to gather cultivated biological organisms for an intended purpose.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hydraulic: As used in this disclosure, hydraulic refers to a device wherein the movement of the device is powered using a liquid under pressure.

Inferior: As used in this disclosure, the term inferior refers to a directional reference that is parallel to and in the same direction as the force of gravity when an object is positioned or used normally.

Jib: As used in this disclosure, a jib is a beam structure that: 1) is mounted with a free end in the manner of a cantilever; and, 2) suspends a load at the free end of the jib. In multicomponent beam structures, such as with a crane, the jib is the sub-structure that physically suspends the load.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Motor: As used in this disclosure, a motor refers to the method of transferring energy from an external power source into rotational mechanical energy.

Offset: As used in this disclosure, an offset refers to the span of distance or cant by which two objects are out of alignment.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Pressure: As used in this disclosure, pressure refers to a measure of force per unit area.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Rigid Structure: As used in this disclosure, a rigid structure is a solid structure formed from an inelastic material that resists changes in shape. A rigid structure will permanently deform as it fails under a force.

Rotation: As used in this disclosure, rotation refers to the cyclic movement of an object around a fixed point or fixed axis. The verb of rotation is to rotate.

Slew: As used in this disclosure, to slew means to turn or rotate an object around a fixed point or axis.

Slewing Bearing: As used in this disclosure, a slewing bearing is a bearing that is used to rotate an object around a vertical axis of rotation. Slewing bearings are typically load-bearing structures.

Stanchion: As used in this disclosure, a stanchion refers to a vertical pole, post, or support. See beam and gusset and strut.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Telescopic: As used in this disclosure, telescopic is an adjective that describes an object made of sections that fit or slide into each other such that the object can be made longer or shorter by adjusting the relative positions of the sections.

Tire: As used in this disclosure, a tire is a solid or air-filled covering for a wheel. The purpose of the tire is to absorb shocks, provide traction, and protect the wheel from wear and other damage.

Tool: As used in this disclosure, a tool is a device, an apparatus, or an instrument that is used to carry out an activity, operation, or procedure.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Vehicle: As used in this disclosure, a vehicle is a motorized device that is used for transporting passengers, goods, or equipment. The term motorized vehicle refers to a vehicle can move under power provided by a hydraulic motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An item of forestry equipment comprising:
a tree harvesting vehicle and a lateral pivot apparatus;
wherein the tree harvesting vehicle comprises a harvest vehicle and a cutting tool;
wherein the lateral pivot apparatus attaches the cutting tool to the harvest vehicle;
wherein the tree harvesting vehicle is supported by a plurality of wheels and tires;
wherein the item of forestry equipment is adapted for use in cutting down a target tree;
wherein the item of forestry equipment is operable to cut down the target tree while the item of forestry equipment is maneuvering on a slope of up to 45.0 degrees;
wherein the item of forestry equipment is operable to pick up the target tree from a horizontal position;
wherein the item of forestry equipment is operable to delimb the target tree;
wherein the lateral pivot apparatus comprises a plate bearing, a plurality of jibs, a hydraulic cylinder, and a stanchion hook;
wherein the plate bearing attaches to the plurality of jibs;
wherein the stanchion hook is attached to the plurality of jibs;
wherein the hydraulic cylinder attaches the stanchion hook to the stanchion.

2. The item of forestry equipment according to claim 1 wherein the lateral pivot apparatus attaches the cutting tool to the harvest vehicle such that the cutting tool rotates around a lateral axis of rotation that is parallel to the center axis of the target tree.

3. The item of forestry equipment according to claim 2
wherein the lateral pivot apparatus aligns the cutting tool with the target tree such that the alignment axis between a plurality of clamping arms of the cutting tool and the target tree is offset from the force of gravity;
wherein by offset is meant that the cutting tool forms a cant between the alignment of the cutting tool with the target tree and the force of gravity.

4. The item of forestry equipment according to claim 3
wherein the tree harvesting vehicle is an agricultural vehicle;
wherein the tree harvesting vehicle grasps the target tree, cuts down the target tree, and processes the target tree;
wherein the tree harvesting vehicle is further defined with a plurality of wheels and tires;
wherein the harvest vehicle is further defined with a primary sense of direction, a forward direction, an aft direction, a port direction, a starboard direction, a superior direction, and an inferior direction.

5. The item of forestry equipment according to claim 4 wherein the harvest vehicle further comprises the plurality of wheels and tires, a bow, and a stern;
wherein each of the plurality of wheels and tires rotates to facilitate the movement of the tree harvesting vehicle.

6. The item of forestry equipment according to claim 5 wherein the cutting tool attaches to the harvest vehicle such that the harvest vehicle will transport the cutting tool to the target tree;
wherein the cutting tool is the working element of the tree harvesting vehicle;
wherein the cutting tool grasps the target tree, cuts down the target tree, and processes the target tree.

7. The item of forestry equipment according to claim 6 wherein the lateral pivot apparatus is a mechanical device;
wherein the lateral pivot apparatus attaches the cutting tool to the harvest vehicle such that the cutting tool rotates around the lateral axis of rotation.

8. The item of forestry equipment according to claim 7 wherein the lateral pivot apparatus creates the cant and the lateral axis of rotation.

9. The item of forestry equipment according to claim 8 wherein the cutting tool further comprises a sawing base, a stanchion, and the plurality of clamping arms;
wherein the sawing base is the working element of the cutting tool;
wherein the stanchion is an extension structure that separates the sawing base from the plurality of clamping arms;
wherein the plurality of clamping arms is a mechanical structure used to grasp the target tree.

10. The item of forestry equipment according to claim 9 wherein the plate bearing is a clewing bearing structure.

11. The item of forestry equipment according to claim 10 wherein the plate bearing attaches to the stanchion of the cutting tool such that the plate bearing forms a load path between the cutting tool and the plurality of jibs.

12. The item of forestry equipment according to claim 11 wherein the plate bearing attaches to the stanchion of the cutting tool such that the stanchion rotates around the lateral axis of rotation;
wherein the plate bearing attaches to the stanchion of the cutting tool such that the lateral axis of rotation of the stanchion is perpendicular to the force of gravity.

13. The item of forestry equipment according to claim 12 wherein the plate bearing further comprises a plate bearing motor;
wherein the plate bearing motor is a hydraulic motor;
wherein the plate bearing motor attaches to the plate bearing;
wherein the plate bearing motor mounts in the stanchion;
wherein the plate bearing motor provides the motive forces required to rotate the stanchion.

14. The item of forestry equipment according to claim 13 wherein the plurality of jibs is a mechanical structure;
wherein the plurality of jibs attaches the plate bearing to the bow of the harvest vehicle;
wherein the plurality of jibs forms a rigid structure that transfers the load of the cutting tool and the plate bearing to the harvest vehicle.

15. The item of forestry equipment according to claim 14 wherein the hydraulic cylinder is a telescopic structure;
wherein the hydraulic cylinder rotates the stanchion within the plate bearing;
wherein the hydraulic cylinder attaches to the stanchion such that the cant of the cutting tool relative to the primary sense of direction of the harvest vehicle changes as a function of the length of the hydraulic cylinder;
wherein the change in length of the hydraulic cylinder rotates the stanchion within the plate bearing to adjust the cant.

16. The item of forestry equipment according to claim 15 wherein the stanchion hook is a rigid curved structure that attaches to the lateral face of the stanchion;
wherein the hydraulic cylinder attaches to the stanchion hook such that the change in length of the hydraulic cylinder transfers a force to the stanchion hook such that the stanchion rotates within the plate bearing.

17. The item of forestry equipment according to claim 16 wherein the plurality of jibs comprises a port jib, a starboard jib, and a crossbeam;
wherein the crossbeam attaches the port jib to the starboard jib such that the center axis of the crossbeam is perpendicular to the center axes of the port jib and the starboard jib.

18. The item of forestry equipment according to claim 17 wherein the port jib is a rigid shaft structure;
wherein the starboard jib is a rigid shaft structure;
wherein the crossbeam is a rigid shaft structure;
wherein the port jib attaches the port side of the plate bearing to the port side of the bow of the harvest vehicle;
wherein the starboard jib attaches the starboard side of the plate bearing to the starboard side of the bow of the harvest vehicle;
wherein the starboard jib is positioned relative to the port jib such that the center axis of the starboard jib is parallel to the port jib.

19. The item of forestry equipment according to claim 18 wherein the hydraulic cylinder mounts on the stanchion hook.

* * * * *